United States Patent [19]

Tomita

[11] Patent Number: 4,788,588
[45] Date of Patent: Nov. 29, 1988

[54] LIQUID CRYSTAL DISPLAY APPARATUS

[75] Inventor: Hideo Tomita, Chiba, Japan

[73] Assignee: Sony Corporation, Tokyo, Japan

[21] Appl. No.: 129,725

[22] Filed: Dec. 7, 1987

[30] Foreign Application Priority Data

Dec. 4, 1986 [JP] Japan ................................ 61-289334

[51] Int. Cl.⁴ ........................ H04N 7/18; H04N 5/14
[52] U.S. Cl. .................................... 358/93; 358/230;
  358/168; 358/169; 340/700
[58] Field of Search ................ 358/93, 168, 169, 254,
  358/230; 340/52 R, 89, 91, 700

[56] References Cited

U.S. PATENT DOCUMENTS

| | | | |
|---|---|---|---|
| 4,403,216 | 9/1983 | Yokoi | 340/700 |
| 4,438,458 | 3/1984 | Münscher | 340/700 |
| 4,584,603 | 4/1986 | Harrison | 358/254 |
| 4,647,980 | 3/1987 | Steventon et al. | 358/254 |

Primary Examiner—James J. Groody
Assistant Examiner—John K. Peng
Attorney, Agent, or Firm—Philip M. Shaw, Jr.

[57] ABSTRACT

A liquid crystal display apparatus wherein the visual angle of the panel relative to a viewer is detected to control a voltage impressed on the liquid crystal electrodes, so that the quality of the image displayed by the panel is not degraded even if the screen visual angle is changed.

14 Claims, 3 Drawing Sheets

LIQUID CRYSTAL DISPLAY APPARATUS

BACKGROUND OF THE INVENTION

1. Field of the Invention

The present invention relates to a liquid crystal display apparatus mounted on a rear face of a seat back of a passenger seat in a passenger aircraft, a train, or the like and, more particularly, to a display apparatus mounted on a reclining seat.

2. Description of the Prior Art

An intra-aircraft display system is proposed wherein a flat display is mounted on the rear face of the back of each seat in an aircraft or train, so that a passenger facing the display can enjoy TV images or receive necessary information. A liquid crystal panel is normally employed as a flat display.

As is known, a liquid crystal display apparatus has a narrow range of allowable visual angle (directivity), and when it is viewed from an angular position falling outside the range, the image quality is considerably degraded. Since the seat back of a passenger seat normally reclines, the screen visual angle is changed in accordance with the reclining angle of the seat, which will be the seat back in front of the viewer, and a degradation in image quality inevitably occurs.

Image quality can be improved to some extent by operating an adjusting control. However, each time the reclining angle of a seat is changed, the adjusting operation must be performed. If a passenger is not accustomed to adjusting, he cannot optimally adjust the image quality.

SUMMARY OF THE INVENTION

The present invention has been made in consideration of the above situation, and has as its object to provide a reclining liquid crystal display apparatus which can provide good image quality even if the reclining angle is changed.

According to the present invention, there is provided a liquid crystal display apparatus mounted on a rear face of each passenger seat back of a line of passenger seats. The liquid crystal display apparatus of the present invention comprises a detection means for detecting a screen visual angle by detecting the reclining angle of the seat back. The display apparatus also has a circuit for changing a voltage impressed on a liquid crystal electrode in accordance with the output from the detection means to thereby change the brightness or contrast level as a function of the reclining angle of the seat back.

It is, therefor, an object of the invention to provide means for automatically adjusting the brightness level of a seat back mounted, flat panel display as a function of the reclining angle of the seat back.

It is a further object of the invention to provide means for automatically adjusting the luminance or the contrast of a seat back mounted liquid crystal display panel as a function of the reclining angle of the seat back to thereby maintain a substantially constant viewing quality for a viewer of the panel.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIGS. 1 to 4 show an embodiment of the present invention, in which:

FIG. 1 is a circuit diagram of a liquid crystal display control circuit;

FIG. 2 is a side view of a reclining seat;

FIG. 3 is a waveform chart of a drive voltage for a liquid crystal display; and

FIG. 4 is a graph showing the relationship of the drive voltage-visual angle characteristics of the liquid crystal display panel.

DESCRIPTION OF THE PREFERRED EMBODIMENT

Figure 1:
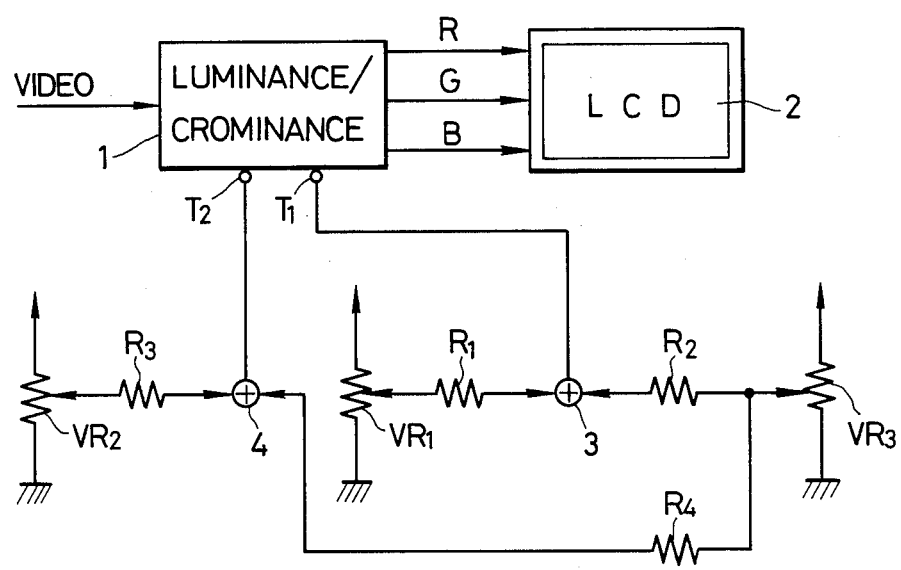

FIG. 1 shows a liquid crystal display control circuit which is arranged on a rear face of a seat back and to which the present invention is applied. An input color video signal is processed by a luminance/chrominance processing circuit 1, and is decoded into R, G, and B signals. The R, G, and B signals are then supplied to a liquid crystal display unit 2. The luminance/chrominance processing circuit 1 has control terminals T1 and T2 for a brightness control input and a contrast (picture) control input respectively. Outputs from potentiometers VR1 and VR2, which are respectively the brightness adjusting control and the contrast adjusting control, are supplied to the control terminals T1 and T1 of the luminance/chrominance processing circuit 1 through adders 3 and 4, respectively. Therefore, the brightness and contrast of the picture can be adjusted by operating the corresponding controls.

Figure 2:
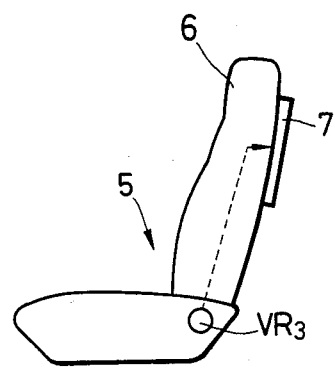

FIG. 2 is a side view of a reclining seat 5. A liquid crystal display 7 is mounted on the rear face of a seat back portion 6. A potentiometer VR3 for detecting the reclining angle is mounted on the pivoting shaft for reclining the seat back portion 6, thereby detecting the reclining angle. The potentiometers VR1, VR2, and VR3 are connected between a bias source (not shown) and a circuit ground.

Referring to FIG. 1, a reclining angle signal as an output from the potentiometer VR3 is supplied to the brightness and contrast control terminals T1 and T2 of the processing circuit 1 through the adders 3 and 4. Even if the screen visual angle is changed in accordance with a change in reclining angle, the directivity of the liquid crystal display unit 2 is automatically corrected in accordance with the reclining angle, so that image quality is not extremely degraded. The addition ratios of the brightness and contrast adjusting control signals and the reclining angle detection control signal can be respectively determined by the proper selection of values for the resistors R1, R2 and R3, and R4 which are connected in series between the respective potentiometers and the adding circuits 3 and 4.

Figure 3:
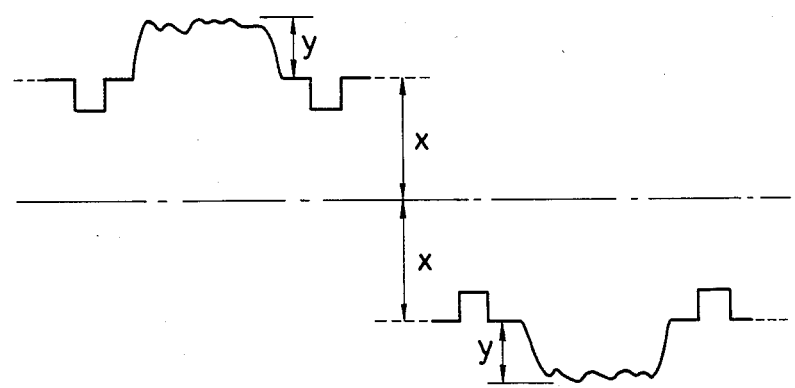

FIG. 3 shows an AC drive waveform impressed on the opposing electrodes of the liquid crystal display unit 2. Drive video signals having opposite polarties are alternately impressed on the opposing electrodes at the predetermined intervals. An AC amplitude x, i.e., the pedestal level of the video signal can be changed in accordance with a signal supplied to the brightness control terminal T1 of the processing circuit 1, and hence, the luminance level can be changed. The amplitude y of the image component of the waveform shown in FIG. 3 can be changed by a signal supplied to the contrast control terminal T2 of the processing circuit, and hence, the image contrast can be changed. The luminance level and the contrast are both changed in accordance with the output from the potentiometer VR3 for detecting the reclining angle to perform automatic adjustment, so that the image quality is not considerably degraded even if the screen visual angle is changed.

Figure 4:
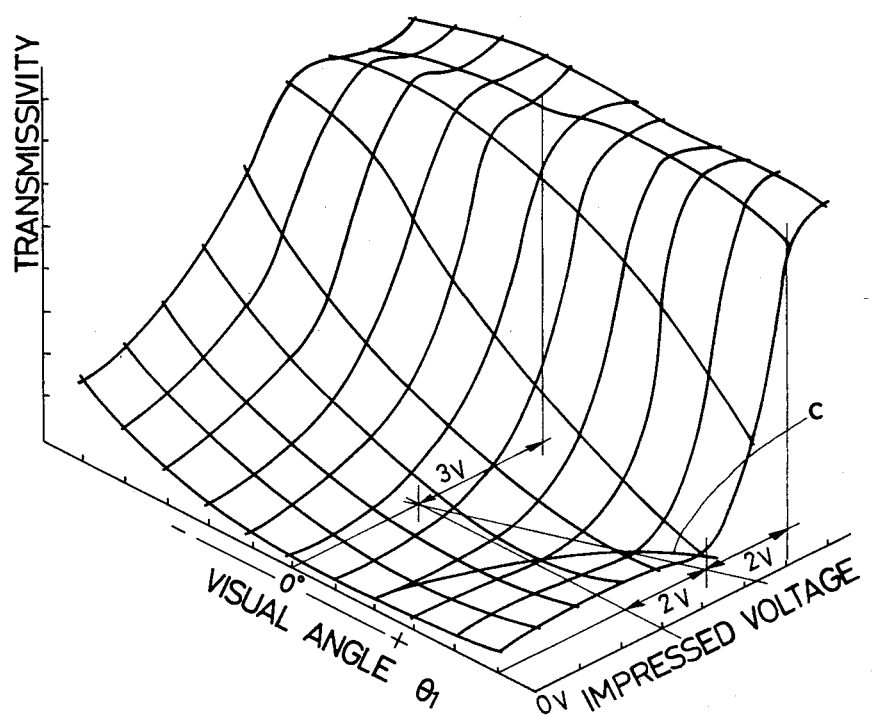

FIG. 4 is a graph showing the display characteristics of a twisted nematic type liquid crystal display unit 2. A screen visual angle $\theta 1$ (an axis perpendicular to a screen surface defines 0°) is plotted along the Y axis, an impressed voltage x is plotted along the X axis, and the transmissivity (luminance) of the screen is plotted along the Z axis. As can be seen from this graph, when the visual angle $\theta$ is increased, the region where the transmissivity changes linearly with respect to the impressed voltage becomes narrow, and the gradient of the voltage-transmissivity curve is also changed. For this reason, unless the impressed voltage level and the image amplitude are changed, the image quality is considerably degraded. In the region inside the bold curve C in FIG. 4, the image quality is degraded due to the large visual angle, and inversion of the black and white portions of the image occurs.

Both the transmissivity and the contrast control factors as a function of the reclining angle can be determined based on FIG. 4. For example, when the visual angle is 0°, the pedestal level x of the video signal shown in FIG. 3 is set to be 1.5V, and the white peak level is set to be about 4.5V (picture amplitude y=3V). When the image visual angle is increased by 20° in a "+" direction, automatic correction is performed in accordance with the output from the potentiometer VR3 so that the pedestal level x is set to be 3.5V, and the white peak level is set to be 5.5V (picture amplitude y=2V). Thus, black-white inversion of the image can be prevented. In addition, the linear region of the impressed voltage-transmissivity characteristics is corrected so as to prevent degradation such as white or black flat painting.

According to the present invention as described above, the angle of a reclining seat is detected to control a voltage impressed on an electrode of the liquid crystal display apparatus. Therefore, even if a screen visual angle is changed in accordance with the reclining angle, the luminance is automatically controlled so that image quality is not degraded.

Although the present invention has been shown and described with respect to preferred embodiments, various changes and modifications which are obvious to a person skilled in the art to which the invention pertains are deemed to lie within the spirit and scope of the invention.

What is claimed is:

1. A liquid crystal display apparatus intended for mounting on a reclining mount and comprising:
    a liquid crystal display panel which can be reclined relative to a viewer of the panel, the display panel having at least one control electrode to which an electrical signal can be supplied to control the quality of an image displayed on the display panel; and
    means for detecting the reclining angle of the panel relative to the viewer and for controlling the magnitude of the electrical signal supplied to the control electrode of the display panel as a function of the detected angle to thereby control the quality of the displayed image as a function of the reclining angle.

2. A liquid crystal display apparatus according to claim 1, wherein the control electrode is for controlling the brightness of an image displayed by the panel and wherein the reclining angle detecting means includes brightness control potentiometer means physically coupled to the panel to be operated by it when the panel is reclined from a first position to a second position, for supplying a control voltage to said first control electrode, said control voltage being varied in accordance with said reclining angle of said panel to thereby automatically adjust the brightness of the displayed image on the panel.

3. A liquid crystal display apparatus according to claims 1 or 2, wherein the control electrode is for controlling the contrast of an image displayed by the panel and wherein the reclining angle detecting means includes contrast control potentiometer means physically coupled to the panel to be operated by it when the panel is reclined from a first position to a second position, for supplying a control voltage to said first control electrode, said control voltage being varied in accordance with said reclining angle of said panel to thereby automatically adjust the contrast of the displayed image on the panel.

4. A liquid crystal display apparatus for mounting on a reclining seat having a back, wherein the display apparatus comprises:
    a liquid crystal display panel provided on the back of said reclining seat; and
    means for controlling the contrast of said liquid crystal display panel according to the reclining angle of said reclining seat.

5. A liquid crystal display apparatus according to claim 4, in which the contrast of said display panel is controllable in response to an external control voltage and said contrast controlling means includes potentiometer means which supplies a control voltage to said display panel, said control voltage being varied in accordance with said reclining angle of said reclining seat.

6. A liquid crystal display apparatus for mounting on a reclining seat having a back, wherein the display apparatus comprises:
    a liquid crystal display panel provided on the back of said reclining seat; and
    means for controlling the brightness of said liquid crystal display panel according to the reclining angle of said reclining seat.

7. A liquid crystal display apparatus according to claim 6, in which the brightness of said display panel is controllable in response to an external control voltage and said brightness controlling means includes potentiometer means which supplies a control voltage to said display panel, said control voltage being varied in accordance with said reclining angle of said reclining seat.

8. A liquid crystal display apparatus according to claims 2, 6, or 7 wherein the display panel is supplied with a color video signal having a pedestal level and said brightness control means controls said pedestal level.

9. A liquid crystal display apparatus according to claims 4 or 5 wherein the display panel is supplied with a color video signal and said contrast control means controls the amplitude of said color video signal.

10. A liquid crystal display apparatus for mounting on reclining seat, the display apparatus comprising:
    a liquid crystal display panel provided on the rear side of said reclining seat;

means for supplying a display signal to said liquid crystal display panel; and means for controlling the voltage of said display signal in accordance with the reclining angle of said reclining seat.

11. A liquid crystal display apparatus according to claim 10, in which said voltage control means includes potentiometer means which produces a control signal in accordance with the reclining angle of said reclining seat.

12. A liquid crystal display apparatus according to claim 11, in which said display signal is a color video signal having a pedestal level.

13. A liquid crystal display apparatus according to claim 12, in which said control means controls said pedestal level of said color video signal.

14. A liquid crystal display apparatus according to claim 13, in which said control means further controls the amplitude of said color video signal.

* * * * *